US012711770B2

(12) United States Patent
Ramesh et al.

(10) Patent No.: US 12,711,770 B2
(45) Date of Patent: Aug. 18, 2026

(54) CONNECTED CAMERA NETWORK WITH SHARED CAMERA SYSTEM VIDEO STREAMS

(71) Applicant: ROKU, INC., San Jose, CA (US)

(72) Inventors: Sunil Ramesh, Saratoga, CA (US); Michael Cutter, Golden, CO (US); Robert Curtis, Los Gatos, CA (US); Gregory Garner, Key Colony Beach, FL (US); Patrick Brouillette, Tempe, AZ (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/457,965

(22) Filed: Aug. 29, 2023

(65) Prior Publication Data

US 2025/0078511 A1 Mar. 6, 2025

(51) Int. Cl.
*G06V 20/52* (2022.01)
*G06V 10/25* (2022.01)
(Continued)

(52) U.S. Cl.
CPC .............. *G06V 20/52* (2022.01); *G06V 10/25* (2022.01); *G06V 20/44* (2022.01); *G06V 40/172* (2022.01);
(Continued)

(58) Field of Classification Search
CPC ........ G06V 20/52; G06V 10/25; G06V 20/44; G06V 40/172; G06V 2201/07; H04N 21/21805; H04N 21/4318
See application file for complete search history.

(56) References Cited

U.S. PATENT DOCUMENTS 10,257,469 B2 * 4/2019 Edwards ................ G08B 13/00
11,363,237 B1 * 6/2022 Block .................. H04M 3/563
(Continued)

FOREIGN PATENT DOCUMENTS

AU 2019275575 A1 * 1/2020 ........... G06F 3/0482
GB 2583821 A * 11/2020 ......... G06K 7/10366
WO WO-2018080650 A2 * 5/2018 ......... G06F 16/7837

OTHER PUBLICATIONS

Shi, Yujiao, and Hongdong Li. "Beyond cross-view image retrieval: Highly accurate vehicle localization using satellite image." Proceedings of the IEEE/CVF Conference on Computer Vision and Pattern Recognition. 2022.
(Continued)

*Primary Examiner* — Gelek W Topgyal
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for sharing video streams in a camera system network. The video streams may be modified and/or masked to obscure private video stream features from being shared. An example embodiment operates by linking a first camera system to a first user device. The first camera system detects a second camera system in its field of view, wherein the second camera system is linked to a second user device. Upon exchanging requests to share video streams, the first and second user devices may view the video streams from both camera systems. The video streams may be modified to mask and/or obscure private property and/or known persons to preserve privacy despite sharing video streams. For example, the first camera system may modify and stream a masked video stream to the second user device.

20 Claims, 13 Drawing Sheets

(51) Int. Cl.

| | |
|---|---|
| ***G06V 20/40*** | (2022.01) |
| ***G06V 40/16*** | (2022.01) |
| ***H04N 21/218*** | (2011.01) |
| ***H04N 21/431*** | (2011.01) |

(52) U.S. Cl.
CPC ... *H04N 21/21805* (2013.01); *H04N 21/4318* (2013.01); *G06V 2201/07* (2022.01)

(56) References Cited

U.S. PATENT DOCUMENTS

| | | | | |
|---|---|---|---|---|
| 11,647,163 | B2 * | 5/2023 | Wu | H04N 7/181 348/159 |
| 11,704,908 | B1 * | 7/2023 | Xu | G06V 40/172 382/181 |
| 11,922,697 | B1 * | 3/2024 | Xu | G06V 10/44 |
| 2015/0116520 | A1 * | 4/2015 | Baym | H04N 5/44 348/211.2 |
| 2015/0156031 | A1 * | 6/2015 | Fadell | G08B 27/003 700/90 |
| 2017/0076572 | A1 * | 3/2017 | Rao | H04N 19/30 |
| 2017/0272731 | A1 * | 9/2017 | Kashyap | H04N 13/254 |
| 2018/0103197 | A1 * | 4/2018 | Campbell | H04W 4/023 |
| 2020/0043185 | A1 * | 2/2020 | Siminoff | G08B 13/19682 |
| 2021/0306597 | A1 * | 9/2021 | Lauer | H04N 23/60 |
| 2022/0057922 | A1 * | 2/2022 | Wang | G06F 3/04847 |
| 2022/0221274 | A1 * | 7/2022 | Fang | G08G 5/55 |
| 2022/0319192 | A1 * | 10/2022 | Tani | G16Y 10/40 |
| 2022/0397686 | A1 * | 12/2022 | Scacchi | G01S 19/485 |
| 2023/0017906 | A1 * | 1/2023 | Drako | H04N 21/472 |
| 2023/0154297 | A1 * | 5/2023 | Drako | H04W 12/08 348/143 |
| 2023/0229805 | A1 * | 7/2023 | Burceanu | H04L 9/0891 726/26 |
| 2024/0267728 | A1 * | 8/2024 | Woodworth | H04W 12/06 |

OTHER PUBLICATIONS

Kirillov, Alexander, et al. "Panoptic segmentation." Proceedings of the IEEE/CVF conference on computer vision and pattern recognition. 2019.

He, Kaiming, et al. "Mask R-CNN." Proceedings of the IEEE international conference on computer vision. 2017.

European Search Report, dated Feb. 19, 2025, for European Patent Application No. 24197015.1, 7 pages.

* cited by examiner

500

600

800A

800B

1000

CONNECTED CAMERA NETWORK WITH SHARED CAMERA SYSTEM VIDEO STREAMS

BACKGROUND

Field

This disclosure is generally directed to camera systems, and more particularly to a camera system network configured to share video streams or modified video streams.

SUMMARY

Provided herein are system, apparatus, article of manufacture, method and/or computer program product embodiments, and/or combinations and sub-combinations thereof, for sharing video streams in a camera system network. The video streams may be modified and/or masked to obscure private video stream features from being shared.

An example embodiment operates by sharing video streams between camera systems. This may generate a camera system network and/or a community of camera systems configured to share video streams. This may provide video stream coverage for a particular geographic area, such as a neighborhood. Similarly, camera feed stitching may occur to provide surveillance coverage of an area. To share video streams, a first camera system may be installed at a particular location. The first camera system may detect a second camera system in its field of view. For example, this may occur during a discovery mode. The first camera system may transmit a command to the second camera system requesting permission to share a video stream. This may be a request to share a video stream from the second camera system to a first user device linked to the first camera system. The first camera system may similarly receive a request to share a video stream with a second user device linked to the second camera system. In this manner, the camera systems may exchange permissions for sharing respective video streams. Upon receiving an acceptance, the camera systems may stream respective video streams to respectively linked user devices with display screens. This streaming and/or management of permissions may be based on user accounts linked to the respective camera systems and/or user devices.

In addition to sharing video streams, a camera system may generate a masked video stream. The masked video stream may obscure one or more features of a video stream. For example, obscuring a feature may include blocking the feature, applying an overlay to the video stream to block the feature from view, pixelating the feature, darkening the feature, blurring the feature, and/or other video stream modification techniques to prevent the viewing of the particular feature on a user device. The obscuring performed by the camera system may provide additional privacy. For example, a camera system may detect and/or obscure portions of private property. A first camera system on first property may generate a video stream that captures portions of the first property as well as portions of second property belonging to another owner. When providing the video stream to a user linked to the first camera system, the first camera system may obscure the portions of the second property. In this manner, the owner may view portions of the video stream corresponding to the first property but not the second property.

The first camera system may share the video stream with a user device linked to the second property. In this scenario, the first camera system may alter the video stream to obscure portions for the first property. That is, the first camera system may generate a masked video stream that masks the first property but reveals the second property. This masked video stream may be provided to a user device linked to the second property. In this manner, the owner of the second property may view portions of the video stream corresponding to the second property but not the first property.

The camera system may also detect one or more other features for masking. For example, the camera system may detect a person in the video stream. Using a machine learning model, the camera system may determine that this person is a known person. For example, a known person may be a neighbor or member of a household. The machine learning model may be preconfigured and/or trained to identify, classify, and/or label known persons. This training may occur using images of known people. Upon detection of a known person in a video stream, the camera system may obscure this person. This may provide additional privacy and/or hide the known person's identity. This obscuring may also be used when sharing video streams with other camera systems and/or other user devices owned by other users having permission to access the video stream from the camera system.

Another feature that the camera system may detect is a predefined trigger event. For example, a machine learning model may be trained to identify a particular occurrence based on training data. For example, this detection may be based on analyzing one or more video stream frames. The machine learning model may be trained to detect the presence of an object, the appearance of an object, the absence of an object, the disappearance of an object, events, and/or other changes between multiple video stream frames. Upon detecting the predefined trigger event, the camera system may transmit a notification message to one or more user devices subscribed to receive notifications from the camera system. For example, this may be a plurality of user device owners who have obtained permission to view video streams from the camera system. The users may be alerted of the predefined trigger event and/or view the corresponding video stream. These video streams may or may not be masked as well.

The camera systems may also be configured to share video streams with emergency response systems. This may occur when a response action to a detected feature or predefined trigger event is to contact an emergency response organization, such as a police system, firefighting system, and/or paramedic system. The camera system may be configured to provide the video stream to the emergency response system when detecting an emergency situation. These video streams may or may not be masked as well.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for sharing video streams in a camera system network. The video streams may be modified and/or masked to obscure private video stream features from being shared.

Some camera systems have been used to detect features and/or monitor households. For example, such camera systems have been placed within homes as well as outdoors to monitor activity related to a home. Such camera systems, however, have limited capabilities and have limited success detecting different features in video streams. For example, while a camera attached to the exterior of a home may point outward, this camera may not provide a view of the exterior of the home itself. For example, a camera attached to the front door of the home may not provide images of the front door itself or the front façade of the home. In contrast, an outwardly pointed camera may capture a view of a neighbor's house or a neighbor's property. Camera owners, however, may wish to avoid seeing to the neighbor's private property. For example, camera owners may wish to avoid being labeled as spying or improperly viewing private property. Similarly, there is an untapped potential where a neighbor's camera may provide a clear view of a particular property. The property's owner may wish to see this view of their own property from their neighbor's camera.

To address such camera system limitations, embodiments described herein describe sharing video streams from camera systems. This sharing of video streams may form a camera system network and/or a community of camera systems configured to share video streams. This may provide video stream coverage for a particular geographic area, such as a neighborhood. Camera systems may manage and/or exchange permissions for sharing video streams with respective user devices for viewing. Additionally, the camera systems may also modify video streams to generate masked video streams. These masked video streams may provide enhanced privacy when sharing the video streams. The camera systems may mask and/or obscure portions of the video stream related to private property, known persons, and/or other video stream features that have been designated as private.

The camera system may also detect a predefined trigger event using a machine learning model. In response to detecting the predefined trigger event, the camera system may transmit a notification message to one or more user devices subscribed to receive notifications from the camera system. The user devices may also display the corresponding video feed. This video feed may or may not be masked. The camera system may also provide the video stream to an emergency response organization. These video streams may or may not be masked as well.

Figure 1:
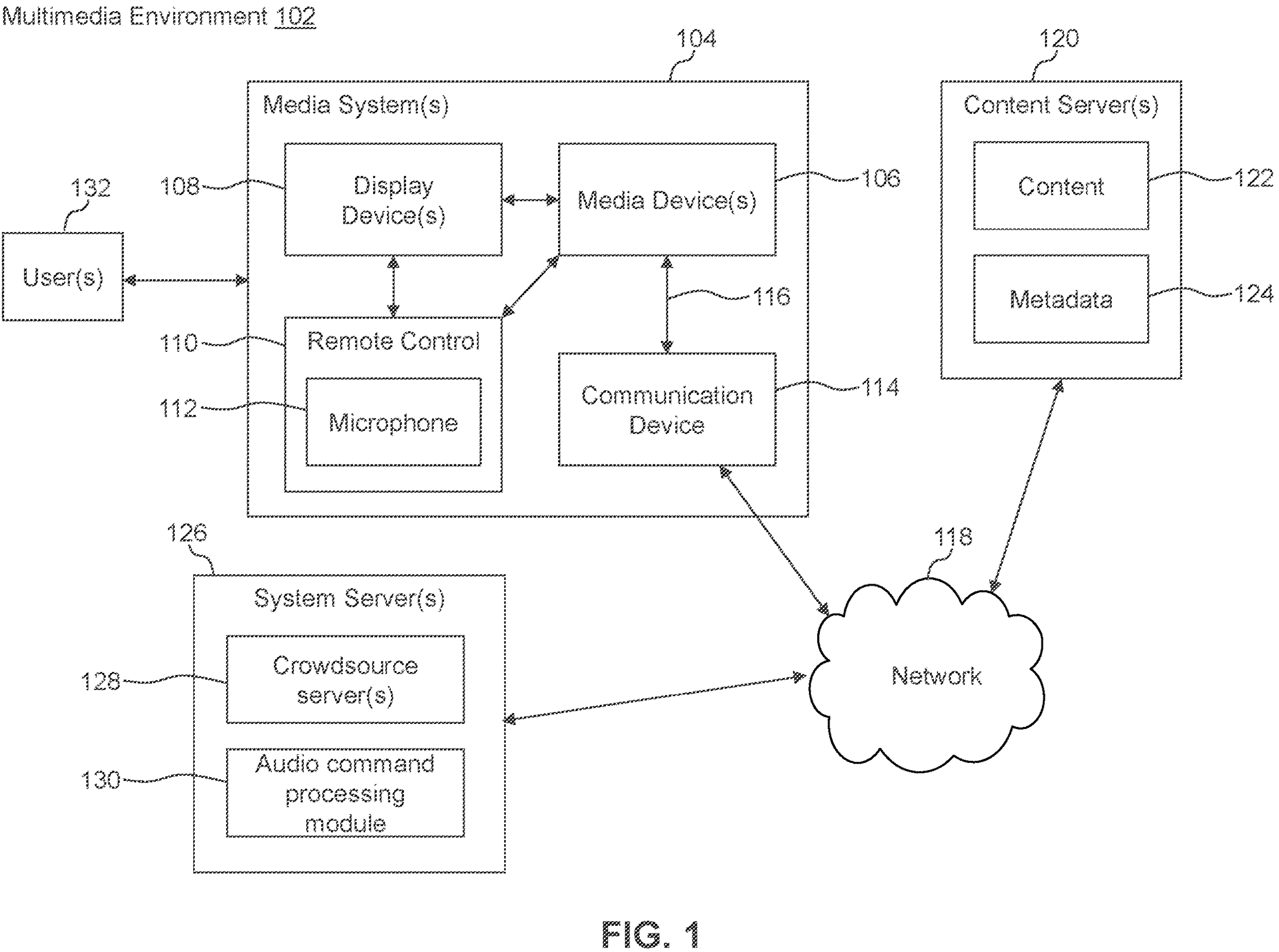
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media. For example, the multimedia environment 102 may implement and/or connect to camera systems. The streaming may include streaming video streams and/or camera feeds from the camera systems to one or more display devices and/or user devices.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content. This may include viewing video streams from a camera system.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. The media device 106 may include and/or be coupled to a camera system. Display device 108 may be a monitor, television (TV), computer, smart phone, tablet, wearable (such as a watch or glasses), appliance, internet of things (IoT) device, and/or projector, to name just a few examples. Media device 106 can be a part of, integrated with, operatively coupled to, and/or connected to its respective display device 108. A camera system may also communicate with and/or provide data to a display device 108. This may be a camera system located in the same area as display device 108 and/or located in a different area. For example, this may include household neighbor camera systems sharing video streams.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

The network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. The remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content may include machine learning models to be loaded into a camera system.

Metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). The media device 106 may be audio responsive, and the audio data may represent verbal commands from the user 132 to control the media device 106 as well as other components in the media system 104, such as the display device 108.

The audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing. As further explained below, a user 132 may provide a verbal command to set the detection of a feature and/or to provide permission for sharing a camera feed. The user 132 may also set a home automation action corresponding to a feature detected via the camera system.

Figure 2:
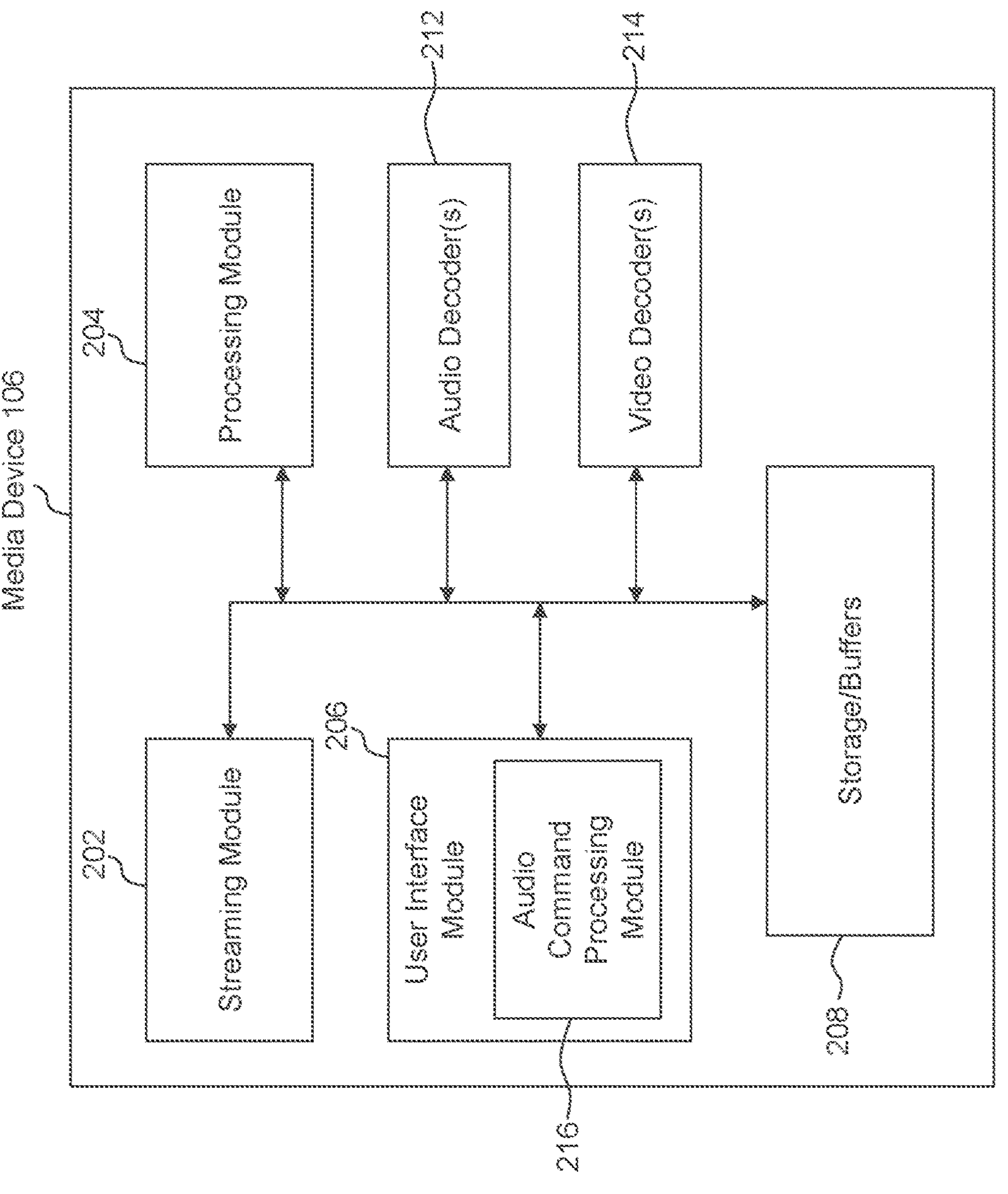
FIG. 2 illustrates a block diagram of a streaming media device, according to some embodiments.

The audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216. Media device 106 may interface with a camera system, may include a camera system, and/or may be included in a camera system.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132. The content and/or playback may be a video stream generated by a camera system.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Camera Systems in a Network

Referring to FIG. 1, media device 106 may interface with one or more camera systems. In some aspects, media device 106 may also include a camera system. In some configurations, a camera system may include media device 106. Media device 106 may output video streams corresponding to one or more camera systems. For example, the camera systems may be in a network and/or belong to different owners. Using display device 108, the user 132 may view one or more video streams captured by respective camera systems. The camera systems may be configured to modify video streams to generate masked video streams. The camera system may also implement one or more machine learning models, which may be trained, configured, and/or tuned to identify particular features. For example, the machine learning model may be trained using images captured by the video stream and/or additional classification data. This training may aid in masking portions of a video stream and/or detecting features in a video stream.

Figure 3:
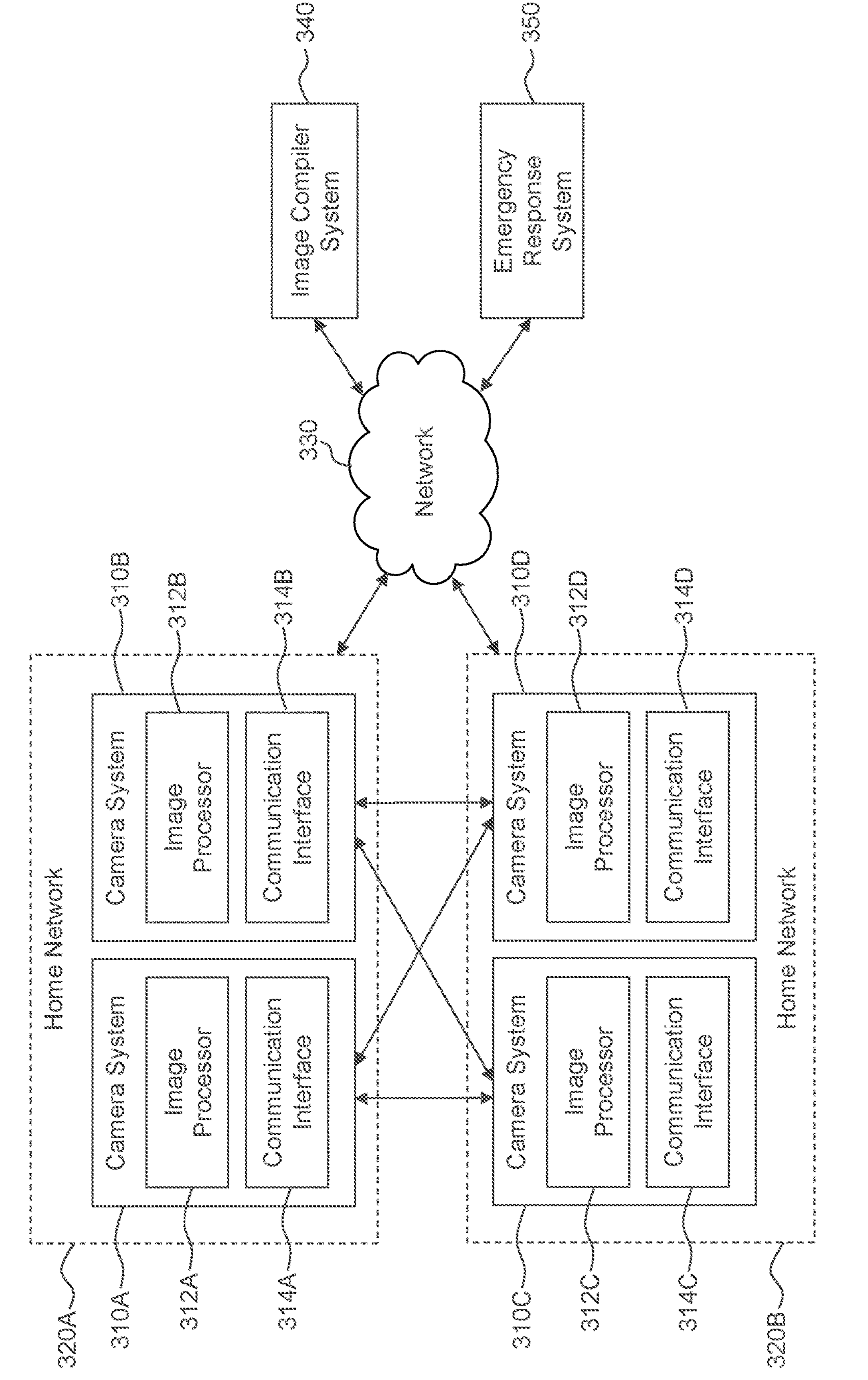
FIG. 3 illustrates a block diagram of a camera system environment, according to some embodiments.

FIG. 3 illustrates a block diagram of a camera system environment 300, according to some embodiments. Camera system environment 300 includes camera systems 310A, 310B, 310C, 310D, home networks 320A, 320B, network 330, image compiler system 340, and/or emergency response system 350. Camera systems 310 may include one or more camera, processors, memories, and/or may implement aspects of computer system 1100 as described with reference to FIG. 11. As previously explained, camera system 310 may also interface with, communicate with, be implemented in, and/or implement media device 106. For example, a user may install one or more camera systems 310 in and/or around a home to monitor one or more video feeds around the house. A camera system 310 may be solar powered and/or resilient to wire cutting. This may refer to power and/or wired communications. Camera system 310 may be fixed, and/or mobile. Some camera systems 310 may fly and/or land on buildings. Some camera systems may be dispatched during high alert scenarios. For example, law enforcement agencies may deploy drones which may include and/or collaborate with camera systems 310.

To capture video feeds, perform the video feed monitoring, modify video feeds, and/or share video feeds, a camera system 310 may include an image processor 312 and/or a communication interface 314. The image processor 312 may be a processor implementing one or more video stream modification techniques. For example, image processor 312 may alter a captured video stream. This alteration may including obscuring portions of the video stream. For example, this may include obscuring portions related to property and/or known persons. To detect such features for obscuring, image processor 312 may also include one or more machine learning models.

The machine learning models may be trained to detect particular features in a video stream. For example, a particular machine learning model may be trained to detect yards, landscapes, property lines, differentiators between indoor and/or outdoor areas, building features, streets, sidewalks, and/or other property features. The machine learning model may also be configured to detect known persons. For example, this may include members of a household or neighbors in a community. This may be performed using training image data.

The machine learning model may also be trained to detect one or more other features. These features may correspond to an object and/or a predefined trigger event. For example, the machine learning model may detect a bear or a child standing by a pool. The machine learning model may be trained to identify a car type and model and/or recognize the alphanumeric characters of a license plate. Another machine learning model may identify the appearance of an animal and/or the type of animal that has appeared. Yet another machine learning model may identify a weather condition based on visual indicators from the video feed, such as the bending of a tree due to wind conditions. A machine learning model may be trained to identify the absence of an object and/or to detect that an object is missing from property. This detection may aid in providing a notification of a predefined trigger event to one or more user devices configured to receive a notification from the camera system 310.

Image processor 312 may communicate with one or more lenses, aperture elements, electronic sensors, and/or camera elements to receive image and/or video stream data. Image processor 312 may then monitor and/or analyze the image and/or video stream data using the one or more loaded machine learning models. Image processor 312 may also mask or obscure one or more features of a video stream.

Image processor 312 may detect one or more features corresponding to the loaded machine learning models. Upon detecting one or more of these features, image processor 312 may generate a camera detection notification. This camera detection notification may indicate the detection of the particular feature. For example, if a bear is detected by a machine learning model configured to detect bears in a video stream, image processor 312 may generate a camera detection notification indicating that a bear has been detected. Camera system 310 and/or image processor 312 may transmit the camera detection notification to one or more user devices and/or a display devices 108 as described with reference to FIG. 1.

Camera systems 310 may also include a communication interface 314. Communication interface 314 may be similar to communication interface 1124 as described with reference to FIG. 11. The communication interfaces 314 may be used to share video streams with other camera systems and/or user devices. The camera systems and/or user devices may have exchanged permissions to view the video streams. Camera systems 310 may communicate directly with other camera systems. Camera systems 310 may also communicate with other camera systems via one or more home networks 320. A home network 320 may include any combination of routers, switches, access points, LANs, WANs, the Internet, network 118, and/or include wired and/or wireless communications. The communication of notifications and/or video streams may also occur via network 330. Providing a video stream may occur via home network 320 and/or network 330.

A camera system 310 may also communicate with image compiler system 340. This may occur via network 330, which may be similar to network 118. Image compiler system 340 may be executed on one or more servers and/or database. Image compiler system 340 may manage user account data corresponding to camera systems 310 and/or user devices. For example, a first user account may be linked to camera systems 310A, 310B and a user device. The user device may allow for the viewing of video streams from camera systems 310A, 310B. If camera system 310C is configured to share a video stream with the user device, the user device may also view this video stream. Image compiler system 340 may manage the permissions and/or facilitate the sharing of video streams between camera systems and/or user devices. For example, a first user account may grant permission to a second user account to view a stream corresponding to camera system 310A. Image compiler system 340 may manage these permissions and/or login credentials related to the user accounts.

Image compiler system 340 may also facilitate the transfer and/or modification of video streams. For example, a camera system 310 may provide video streams to image compiler system 340. Image compiler system 340 may then route and/or provide the received video streams based on the corresponding permissions. The modification of a video stream, such as obscuring portions of the video stream, may occur at a camera system 310 prior to transmission and/or at image compiler system 340. For example, the methods described with reference to FIGS. 7, 8A, 8B, 9, and/or 10 may be performed by a camera system 310 and/or an image compiler system 340. In some aspects, image compiler system 340 may be implemented within a home network 320. For example, a home network 320 may include one or more computing devices and/or servers used to implement image compiler system 340. Image compiler system 340 may be communicatively coupled to one or more camera systems 310 within home network 430. For example, communications may occur using any combination of routers, switches, access points, LANs, and/or include wired and/or wireless communications. In some aspects, image compiler system 230 may be implemented in a camera system 310 and/or share hardware components with camera system 310. For example, one or more hardware components and/or functionality corresponding to image compiler system 340 may be implemented in a camera system 310.

Camera system 310 may also communicate with an emergency response system 350. This may occur when a response action to a detected feature is to contact an emergency response organization, such as a police system, firefighting system, and/or paramedic system. Camera system 310 may be configured to communicate with these systems when detecting an emergency situation. For example, camera system 310 may include a video stream that has a portion of the stream capturing the front yard of a neighboring house across the street. The video stream may or may not be masked or be obscured. The front yard may catch fire. Camera system 310 may detect this fire via a machine learning model configured to identify fire in a video stream. In response, camera system 310 may transmit an alert message to emergency response system 350 to request emergency assistance. This may be a data packet and/or API call transmitted via network 330. This may occur for detected features related to Amber alerts and/or with recognition of criminals. This may also occur if camera system 310 detects a thief stealing property. For Amber alerts, data related to a particular vehicle and/or a child may be pushed to camera system 310. Camera system 310 may retrain a machine learning model with this data to detect features specific to an Amber alert.

Figure 4A:
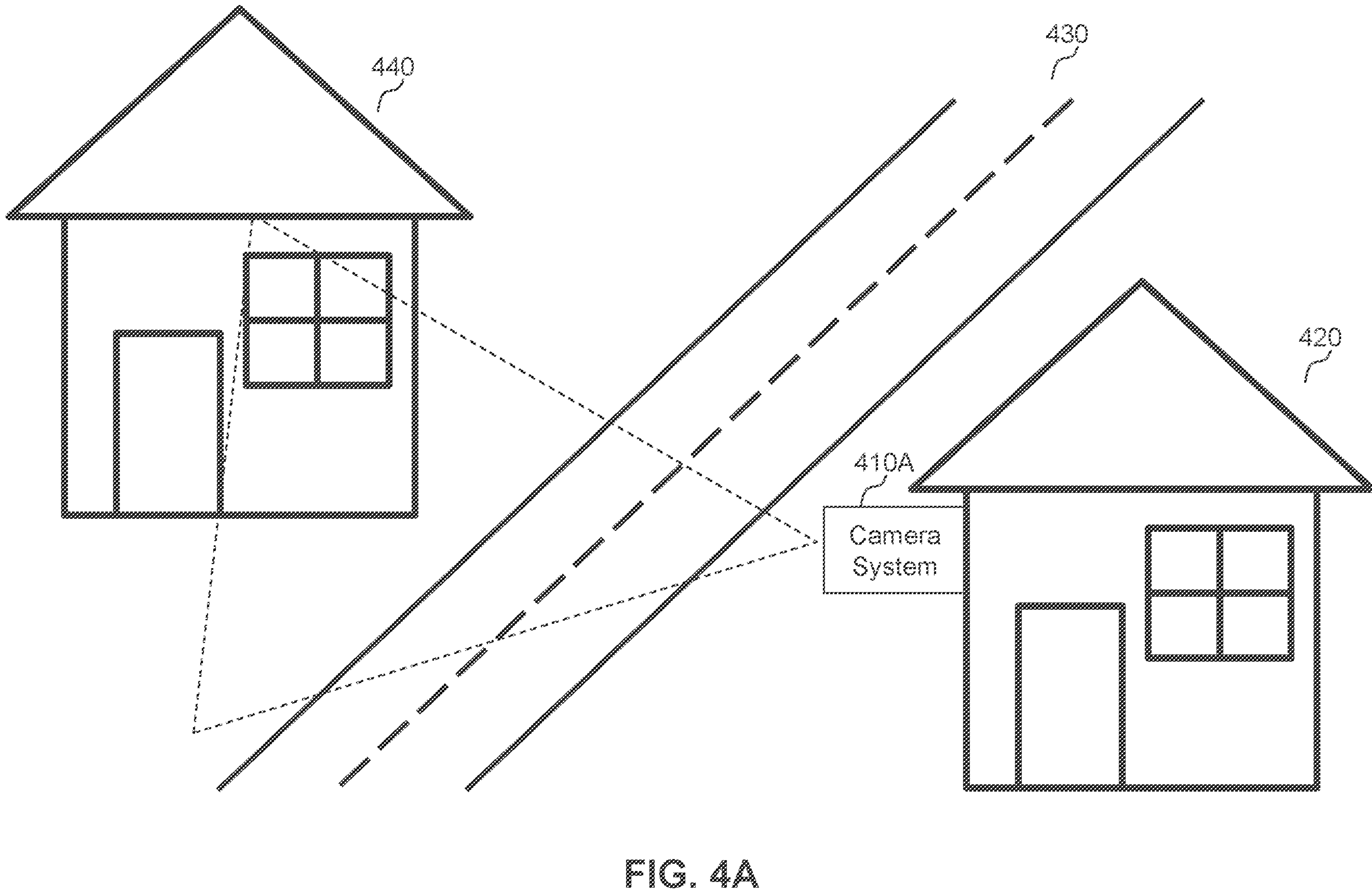
FIG. 4A illustrates a block diagram of a camera system detecting features, according to some embodiments.

FIG. 4A illustrates a block diagram of a camera system 410A detecting features, according to some embodiments. Camera system 410A may be similar to camera system 310 as described with reference to FIG. 3. Camera system 410A may be attached to a property 420. Property 420 may include a house and/or an area surrounding a house. Camera system 410A may capture images, camera feeds, video frames, and/or video streams, from the interior and/or the exterior of the property 420. One or more camera systems 410 may be placed in, on, and/or around the property 420. The property 420 may implement home network 320 to interconnect camera systems 410 and/or to facilitate communications between the camera systems 410. Camera systems 410 may also be placed on buildings, boats, cruise ships, and/or other locations.

As previously explained, camera system 410A may capture portions of property 420 which may correspond to the owner of camera system 410A. This may be private property. Camera system 410A may also capture public property 430. This public property 430 may include a street or sidewalk. Camera system 410A may also capture private property 440. Private property 440 may correspond to another house and/or an area surrounding a house. This private property 440 may not correspond to the owner of camera system 410A. Camera system 410A may provide a video feed to the owner of property 420 that includes portions relating to property 420 and/or public property 430. The video feed may be modified to mask or obscure portions corresponding to property 440.

While the term property 420, 440 may be used to include a house or home, this may also apply to other portions of property include a yard and/or interior portions of a property 420, 440. For example, if camera system 410A has a view into the window of house corresponding to property 440, this view may also be masked and/or obscured.

Camera system 410A and/or image compiler system 340 may also estimate a pose corresponding to camera system 410A. This pose may reflect a particular viewing angle captured and/or provided by camera system 410A. For example, a pose may reflect a position or rotation of camera system 410A. These parameters may correspond to a 3 degree of freedom position and/or a 3 degree of freedom rotation. This may also be applicable when camera system 410A is a monocular camera. This may aid in determining and/or identifying different portions of property 420, 430, and/or 440, which may be public, private, personal, shared, and/or categorized in a different manner. Given the pose of camera system 410A and/or by cross-referencing property maps, the property regions and/or public or private spaces may be inferred. In some aspects, camera system 410A and/or an image compiler system 340 may use aerial photography and/or a geographic address corresponding to property 420 to determine and/or estimate a pose corresponding to camera system 410A.

Using this pose information, camera system 410A and/or image compiler system 340 may also detect camera streams that identify property 420. This is described further with reference to FIG. 4B. The pose information may also be used to identify other camera systems 410 that may capture images of property 420. For example, the position of a particular house may be estimated using a determined camera pose and/or a predicted monocular depth. This may aid in estimating a three-dimensional position of a region of interest. Camera system 410A and/or image compiler system 340 may cross-reference the region of interest with property maps and/or publish the region information to a database.

Camera system 410A and/or image compiler system 340 may also use computer vision segmentation techniques to classify regions within an image. For example, camera system 410A and/or image compiler system 340 may use instance segmentation and/or panoptic segmentation to classify regions. This classification may identify private property versus public property. The classification may also classify regions by labeling portions of an image. For example, labels may include yard, sidewalk, street, house, and/or other labels in the image. As further described with reference to FIG. 5, when generating masks, the classified regions may also designate personal masks, public masks, and/or private masks. These may be provided as suggestions by camera system 410A and/or image compiler system 340.

Figure 4B:
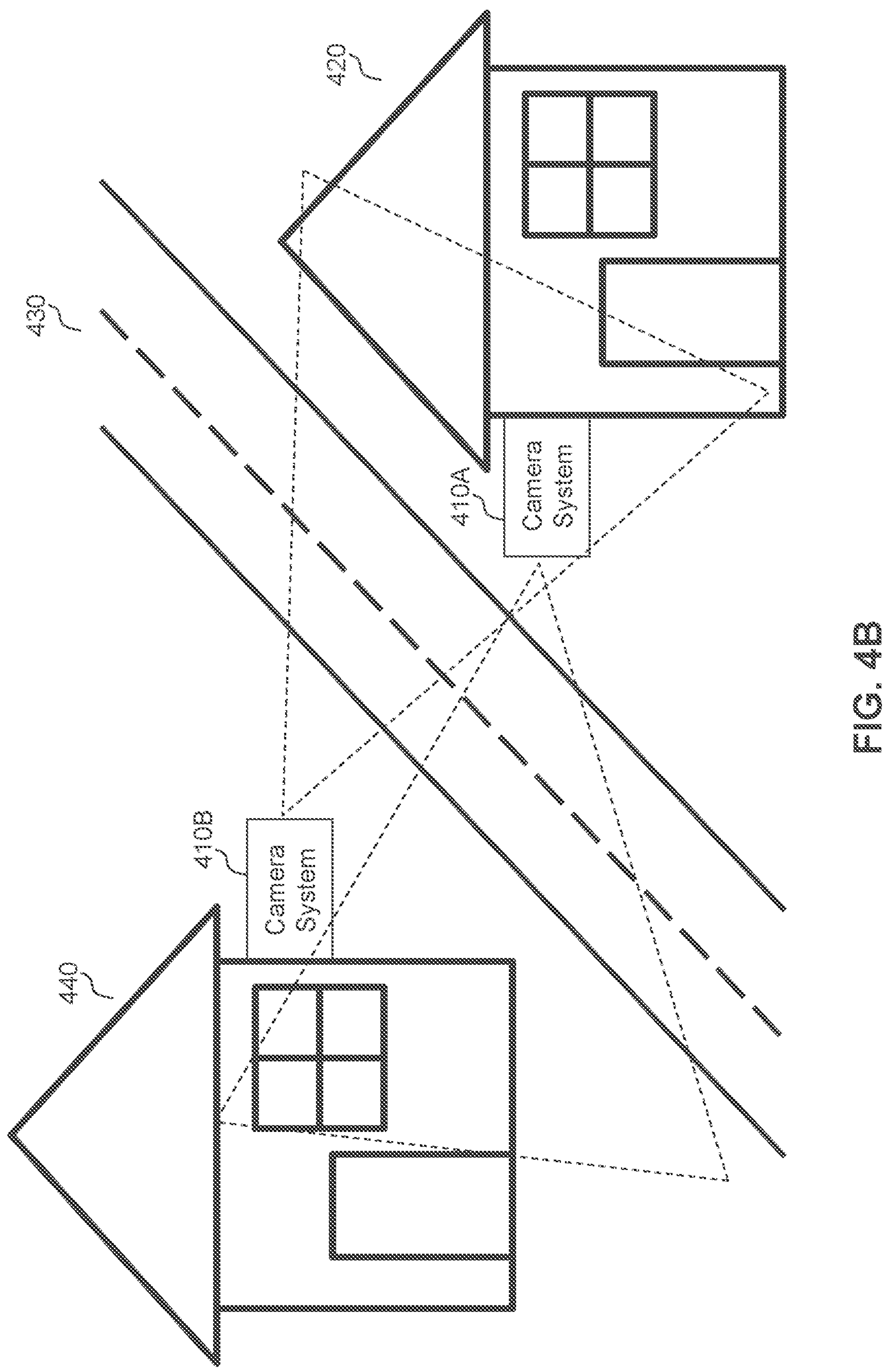
FIG. 4B illustrates a block diagram of a first camera system detecting the presence of a second camera system, according to some embodiments.

FIG. 4B illustrates a block diagram of a first camera system 410A detecting the presence of a second camera system 410B, according to some embodiments. Similar to FIG. 4A, the block diagram may also include property 420, public property 430, and/or property 440. As previously explained, first camera system 410A may capture portions of property 420, public property 430, and/or portions of property 440. When camera system 410A provides a video stream to a user device corresponding to an owner of property 420, camera system 410A may mask and/or obscure portions of the video stream corresponding to property 440 as previously explained. Similarly, when camera system 410B provides a video stream to a user device corresponding to an owner of property 440, camera system 410B may mask and/or obscure portions of the video stream corresponding to property 420.

As previously explained, however, camera system 410A may also provide a video stream to a user device corresponding to an owner of property 440. In this case, camera system 410A may mask portions of the video stream corresponding to property 420. Similarly, camera system 410A may reveal portions of the video stream corresponding to property 440. In this manner, the owner of property 440 may view a video stream of their own property using a user device and/or corresponding user account that has permission to view the video stream from camera system 410A.

Similarly, camera system 410B may also provide a video stream to a user device corresponding to an owner of property 420. In this case, camera system 410B may mask portions of the video stream corresponding to property 440. Similarly, camera system 410B may reveal portions of the video stream corresponding to property 420. In this manner, the owner of property 420 may view a video stream of their own property using a user device and/or corresponding user account that has permission to view the video stream from camera system 410B.

Camera systems 410A, 410B may also be configured to not mask and/or not obscure video streams. In this case, the video streams may be shared with other users having permissions. Camera systems 410A, 410B may also be configured to share video streams with third parties. For example, this may include neighbors in the community and/or emergency response systems. These third parties may received masked and/or non-masked video streams. This may depend on the permissions provided to the third parties.

Figure 5:
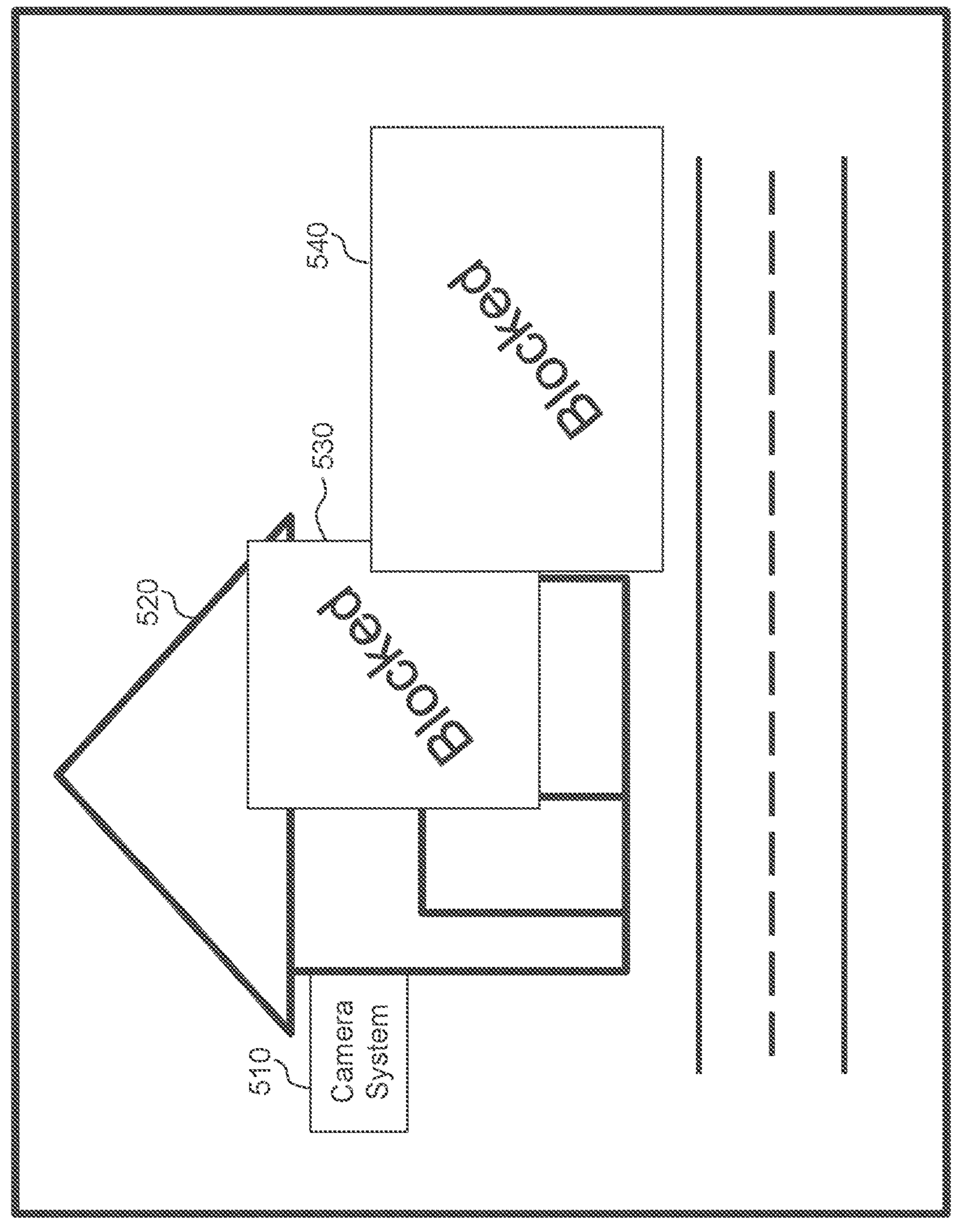
FIG. 5 illustrates a block diagram of a graphical user interface depicting a masked video stream that obscures property, according to some embodiments.

FIG. 5 illustrates a block diagram of a graphical user interface (GUI) 500 depicting a masked video stream that obscures property 520, according to some embodiments. GUI 500 may be displayed on a user device and/or a display device 108. GUI 500 may display a video stream from a particular camera system. For example, this may be camera system 310. In an example, the video stream may correspond to camera system 410A. The foregoing description will use camera system 410A for explanation, but GUI 500 is not limited solely to this configuration.

GUI 500 may depict the field of view captured by the camera system 410A. GUI 500 may include camera system 510, property 520, a first privacy mask 530, and/or a second privacy mask 540. For example, GUI 500 may depict property 520, which may not belong to the owner of camera system 410A. Similarly, a user account corresponding to camera system 410A may not have permission to view portions of property 520. In this case, a first privacy mask 530 and/or a second privacy mask 540 may be applied to the video stream. Camera system 410A and/or image compiler system 340 may apply the masks.

First privacy mask 530 and/or second privacy mask 540 may obscure one or more features of a video stream. For example, obscuring a feature may include blocking the feature, applying an overlay to the video stream to block the feature from view, pixelating the feature, darkening the feature, blurring the feature, and/or other video stream modification techniques to prevent the viewing of the particular feature on a user device. The obscuring may provide additional privacy.

For example, first privacy mask 530 may block a view into a window of a home on property 520. This may prevent a user from viewing the interior of a home. Second privacy mask 540 may block an exterior portion of property 520. For example, this may be a pool or other private area. The presence of a privacy mask 530, 540 may depend on permissions granted to a user account by an owner of property 520.

GUI 500 may also provide an aerial layout of a neighborhood. For example, this layout may include a combination of aerial images and/or captured video streams. The masked objects may be depicted in GUI 500. GUI 500 may be viewable on a display device, a virtual reality headset, and/or an augmented reality system. GUI 500 may also include view scaling and/or transparency processes to allow for different degrees of view. This may include through walls and/or objects. Masking may still occur in this instance. GUI 500 when using aerial layout information may also be used to provide a recommendation for placing additional cameras. In a group or communal setting, group members may also be provided with voting options to place additional cameras.

Figure 6:
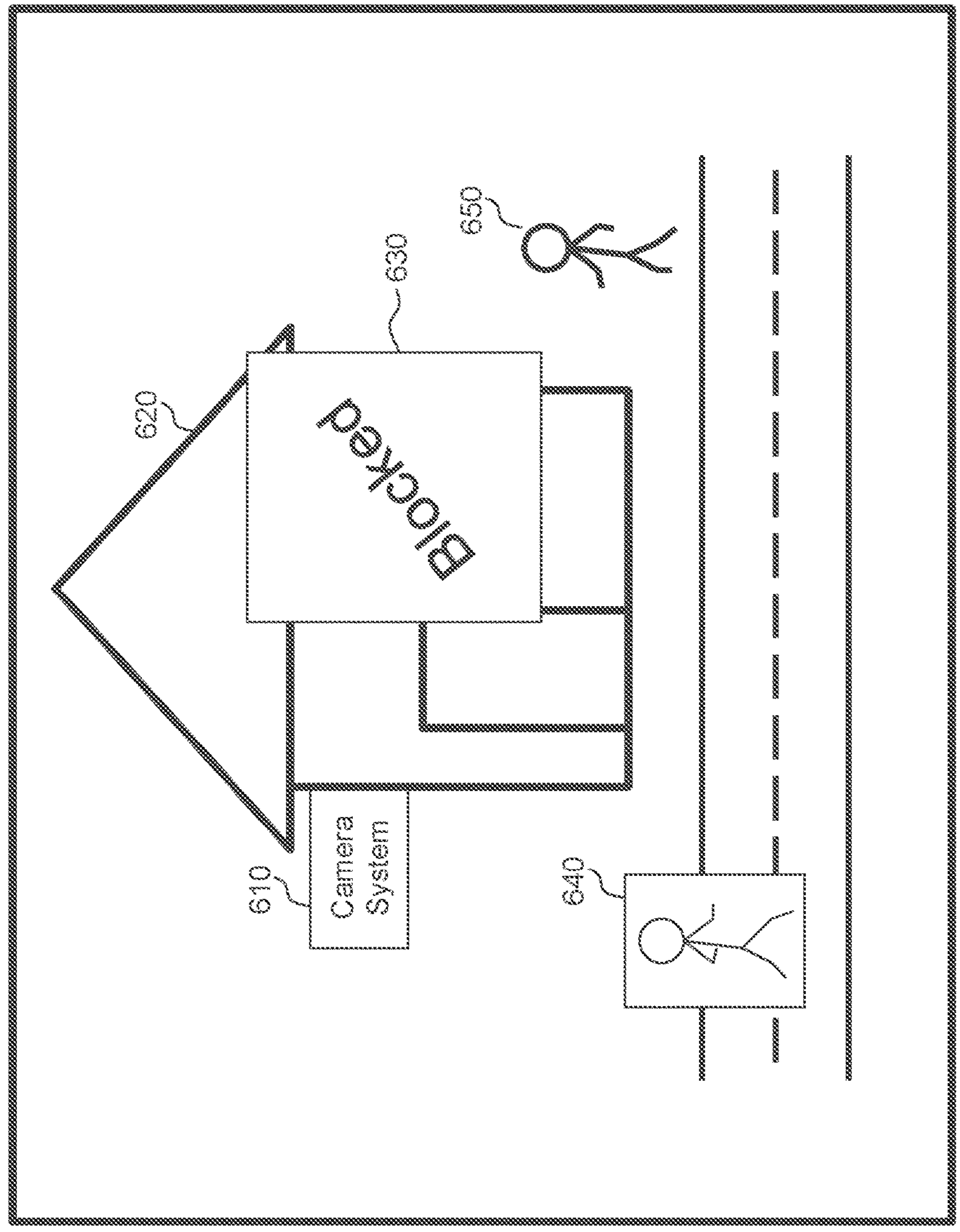
FIG. 6 illustrates a block diagram of a graphical user interface depicting a masked video stream that obscures a known person, according to some embodiments.

FIG. 6 illustrates a block diagram of a graphical user interface (GUI) 600 depicting a masked video stream that obscures a known person, according to some embodiments. GUI 600 may be displayed on a user device and/or a display device 108. GUI 600 may display a video stream from a particular camera system. For example, this may be camera system 310. In an example, the video stream may correspond to camera system 410A. The foregoing description will use camera system 410A for explanation, but GUI 600 is not limited solely to this configuration.

GUI 600 may depict the field of view captured by the camera system 410A. GUI 600 may include camera system 610, property 620, a privacy mask 630, a known person mask 640, and/or an unidentified person 650. For example, GUI 600 may depict property 620, which may not belong to the owner of camera system 410A. Similarly, a user account corresponding to camera system 410A may not have permission to view portions of property 620. In this case, a privacy mask 630 may be applied to the video stream. Camera system 410A and/or image compiler system 340 may apply the masks. This may be similar to privacy masks 530, 540 as described with reference to FIG. 5.

GUI 600 may also include a known person mask 640. The known person mask 640 may obscure a predefined and/or pre-designated person. This may be a member of a household and/or a neighbor. A machine learning model may be preconfigured and/or trained to identify, classify, and/or label known persons. This training may occur using images of known people. Upon detection of a known person in a video stream, the camera system 410A may obscure this person using known person mask 640. This may provide additional privacy and/or hide the known person's identity. Known person mask 640 may include a cartoon and/or other avatar to replace the person in the video stream viewed via GUI 600. For example, known person mask 640 may include a stick figure.

GUI 600 may also include an unidentified person 650. Unidentified person 650 may be observed by a machine learning model but may not have associated privacy masking. For example, this may be a stranger wandering in a neighborhood. A person might be detected but the machine learning model may not have identified a corresponding identity. In this case, GUI 600 may not mask this person. For example, user devices displaying GUI 600 may allow users to view the identity of unidentified person 650.

GUI 600 may use different labels and/or identifiers to distinguish known person mask 640 and unidentified person 650. For example, GUI 600 may use different color to differentiate whether a person is known or unknown. GUI 600 may also use annotations and/or text to identify known person mask 640 and/or unidentified person 650. Known person mask 640 and/or unidentified person 650 identifiers may also be used when providing GUI 600 and/or its corresponding video stream to an emergency response system 350. A camera system 410A may obscure a known person using known person mask 640 when providing this video stream. This may aid in preserving the known person's privacy. GUI 600, however, may not mask the identity of unidentified person 650.

Figure 7:
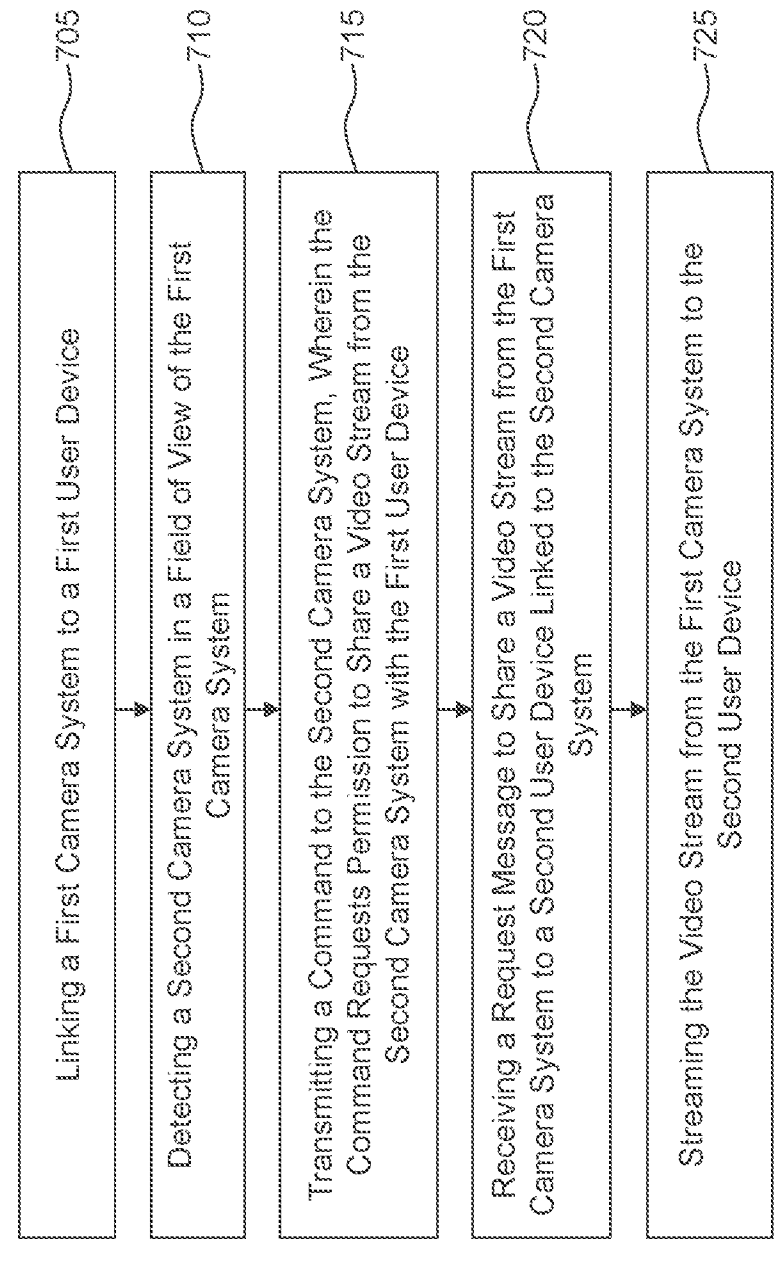
FIG. 7 illustrates a flowchart depicting a method for sharing video streams, according to some embodiments.

FIG. 7 illustrates a flowchart depicting a method 700 for sharing video streams, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 4B. However, method 700 is not limited to that example embodiment. A first camera system 410A may interact with a second camera system 410B to share video streams to respective user devices. While method 700 is described with reference to camera systems 410A, 410B, method 700 may be executed on any camera system 310, image compiler system 340, and/or any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

At 705, first camera system 410A links a first user device. For example, a user may have a first user account. This may be managed by image compiler system 340 and/or by the user device. The user account may have login credentials. When the first camera system 410A is installed and/or powered on, first camera system 410A may link to a first user device. For example, first camera system 410A and/or the first user device may perform a discovery and/or detection process via home network 320. Linking first camera system 410A to the first user device may allow the first user device to view the video stream from the first camera system 410A.

At 710, first camera system 410A detects a second camera system 410B in a field of view. For example, first camera system 410A and/or second camera system 410B may enter a discovery mode. First camera system 410A may use image processing and/or identification techniques to identify second camera system 410B. Second camera system 410B may also transmit a beacon signal or strobing signal that is detectable by first camera system 410A. This may be via camera and/or other radio, IR, or RF communications. First camera system 410A may broadcast a signal which may be detected by second camera system 410B. This broadcasted signal may trigger second camera system 410B to send a beacon signal or a strobing signal. First camera system 410A may detect the beacon or strobing signal and/or establish communications with second camera system 410B. This may include wireless communications.

First camera system 410A may have also joined a pool or network of cameras. This pool may also include second camera system 410B and/or other camera systems. Neighbors may agree to share video streams. An administrator may also invite members to the group. The members may pool the camera feeds.

At 715, first camera system 410A transmits a command to the second camera system 410B. The command requests permission to share a video stream from the second camera system 410B with the first user device. For example, the command may include an identifier of the first user account corresponding to the first user device. The first user device may also transmit this command. Upon acceptance of the request and/or the second camera system 410B providing permissions, this may allow the first user device to view the video stream from the second camera system 410B. The second camera system 410B may stream the video stream to the first user device.

At 720, first camera system 410A receives a request message to share a video stream from the first camera system 410A to a second user device linked to the second camera system 410B. The request message may include an identifier of the second user account corresponding to the second user device. The request message may be received from the second user device and/or the second camera system 410B. Upon acceptance of the request and/or the first camera system 410A providing permissions, this may allow the second user device to view the video stream from the first camera system 410A. The first camera system 410A may stream its video stream to the second user device.

At 725, first camera system 410A streams the video stream to the second user device. This streaming may occur as a direct wireless communication to second user device, may occur via one or more home networks 320 and/or networks 330, and/or facilitated by image compiler system 340.

Figure 8A:
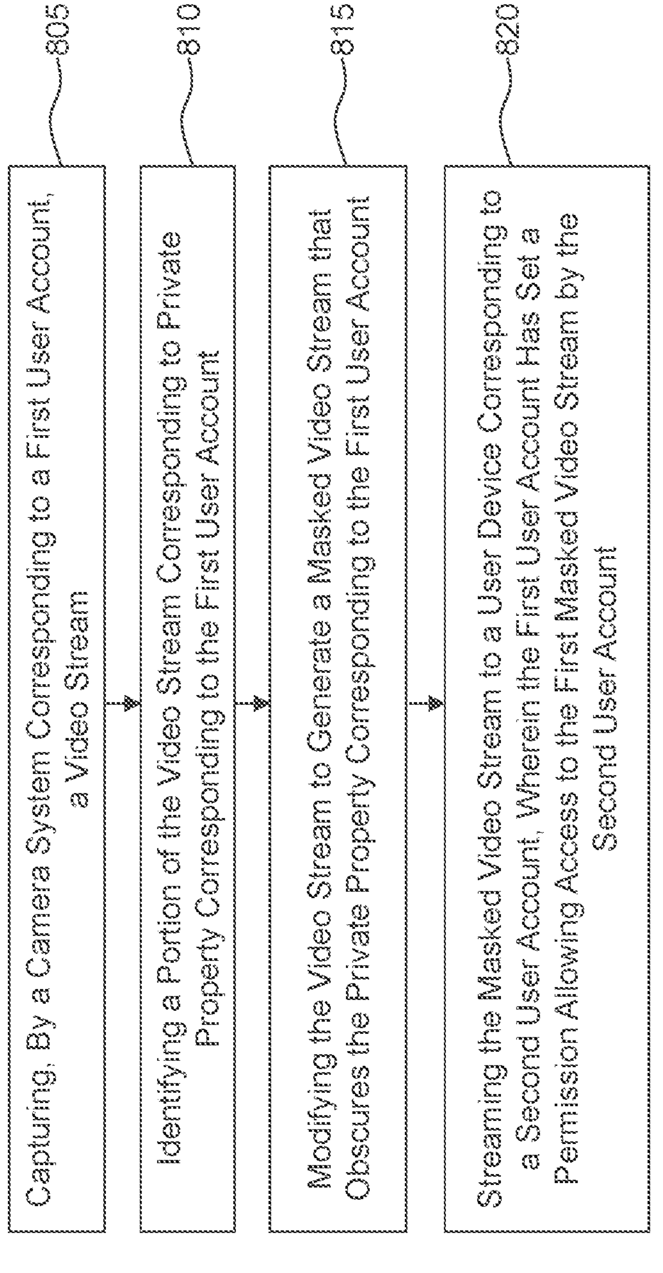
FIG. 8A illustrates a flowchart depicting a method for generating a masked video stream that obscures property to others, according to some embodiments.

FIG. 8A illustrates a flowchart depicting a method 800A for generating a masked video stream that obscures property to others, according to some embodiments. Method 800A can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8A, as will be understood by a person of ordinary skill in the art.

Method 800A shall be described with reference to FIG. 4B. However, method 800A is not limited to that example embodiment. A camera system 410A may modify a video stream to obscure private property when sharing video streams to user devices. While method 800A is described with reference to camera system 410A, method 800A may be executed on any camera system 310, image compiler system 340, and/or any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

At 805, camera system 410A, corresponding to a first user account, captures a video stream. This may include recording one or more images and/or video frames. Camera system 410A may use image processor 312 to capture the video stream. Camera system 410A may capture one or more video frames using one or more lenses, aperture elements, electronic sensors, and/or camera elements. Camera system 410A may convert the captured images into digital data for analysis and/or modification.

At 810, camera system 410A identifies a portion of the video stream corresponding to private property 420 corresponding to the first user account. Camera system 410A may be loaded with global positioning data, geographic layout data, and/or other property data used to delineate property. A machine learning model may determine the lines for designating property using such information. Camera system 410A may also present a GUI for a user to provide an indication of property and/or draw a property demarcation. Using this information, camera system 410A identifies property 420 corresponding to the first user account.

At 815, camera system 410A modifies the video stream to generate a masked video stream that obscures the private property 420 corresponding to the first user account. This masking may occur in a manner similar to that described with reference to FIG. 4B and/or FIG. 5. The masking may obscure private property 420 from the view of a second user account.

At 820, camera system 410A streams the masked video stream to a user device corresponding to the second user account, wherein the first user account has set a permission allowing access to the first masked video stream by the second user account. This masking may occur in a manner similar to that described with reference to FIG. 4B and/or FIG. 5. The masking may obscure private property 420 from the view of a second user account.

Camera system 410A may execute method 800A multiple times to continuously produce a masked video stream.

Figure 8B:
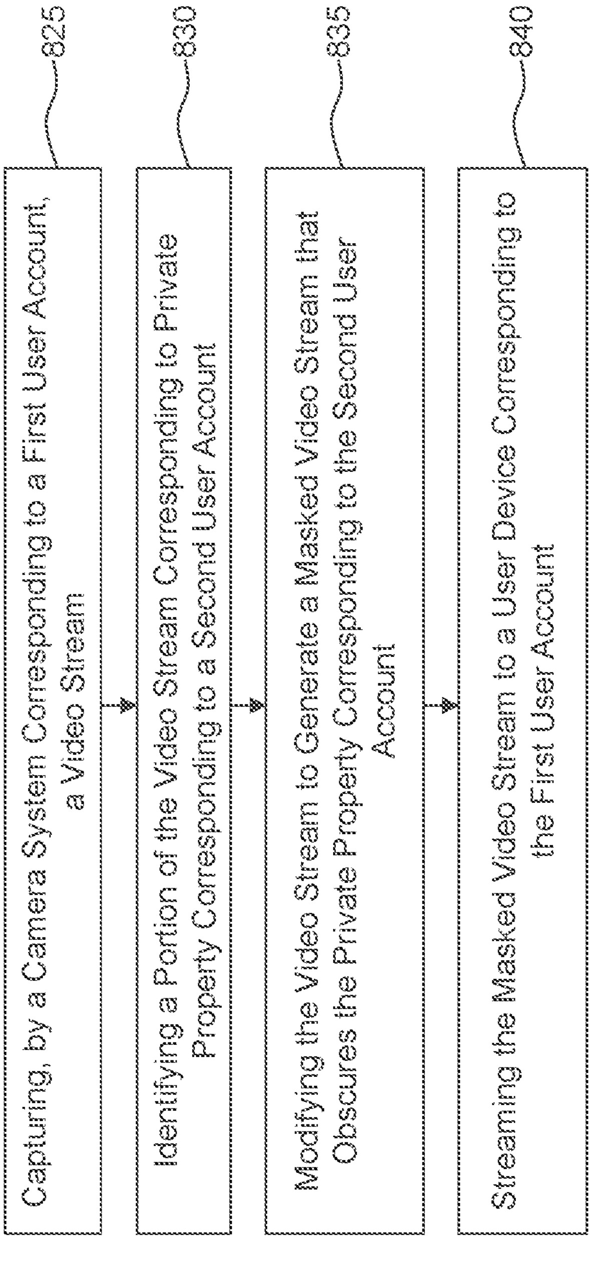
FIG. 8B illustrates a flowchart depicting a method for generating a masked video stream that obscures others' property, according to some embodiments.

FIG. 8B illustrates a flowchart depicting a method 800B for generating a masked video stream that obscures others' property 440, according to some embodiments. Method 800B can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8B, as will be understood by a person of ordinary skill in the art.

Method 800B shall be described with reference to FIG. 4B. However, method 800B is not limited to that example embodiment. A camera system 410A may modify a video stream to obscure private property belonging to another when viewing a video stream on a user device. While method 800B is described with reference to camera system 410A, method 800B may be executed on any camera system 310, image compiler system 340, and/or any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

At 825, camera system 410A, corresponding to a first user account, captures a video stream. This may include recording one or more images and/or video frames. Camera system 410A may use image processor 312 to capture the video stream. Camera system 410A may capture one or more video frames using one or more lenses, aperture elements, electronic sensors, and/or camera elements. Camera system 410A may convert the captured images into digital data for analysis and/or modification.

At 830, camera system 410A identifies a portion of the video stream corresponding to private property 440 corresponding to a second user account. Camera system 410A may be loaded with global positioning data, geographic layout data, and/or other property data used to delineate property. A machine learning model may determine the lines for designating property using such information. Camera system 410A may also present a GUI for a user to provide an indication of property and/or draw a property demarcation. A user corresponding to the second user account may have previously provided this demarcation data. Using this information, camera system 410A identifies property 440 corresponding to the second user account.

At 835, camera system 410A modifies the video stream to generate a masked video stream that obscures the private property 440 corresponding to the second user account. This masking may occur in a manner similar to that described with reference to FIG. 4B and/or FIG. 5. The masking may obscure private property 440 from the view of a first user account.

At 840, camera system 410A streams the masked video stream to a user device corresponding to the first user account. This masking may occur in a manner similar to that described with reference to FIG. 4B and/or FIG. 5. The masking may obscure private property 440 from the view of the first user account. The first user account may already have permissions to view its own video streams. This modification, however, may still obscure property corresponding to a second user account from view by the owner, user account, and/or user device linked to camera system 410A.

Camera system 410A may execute method 800B multiple times to continuously produce a masked video stream.

Figure 9:
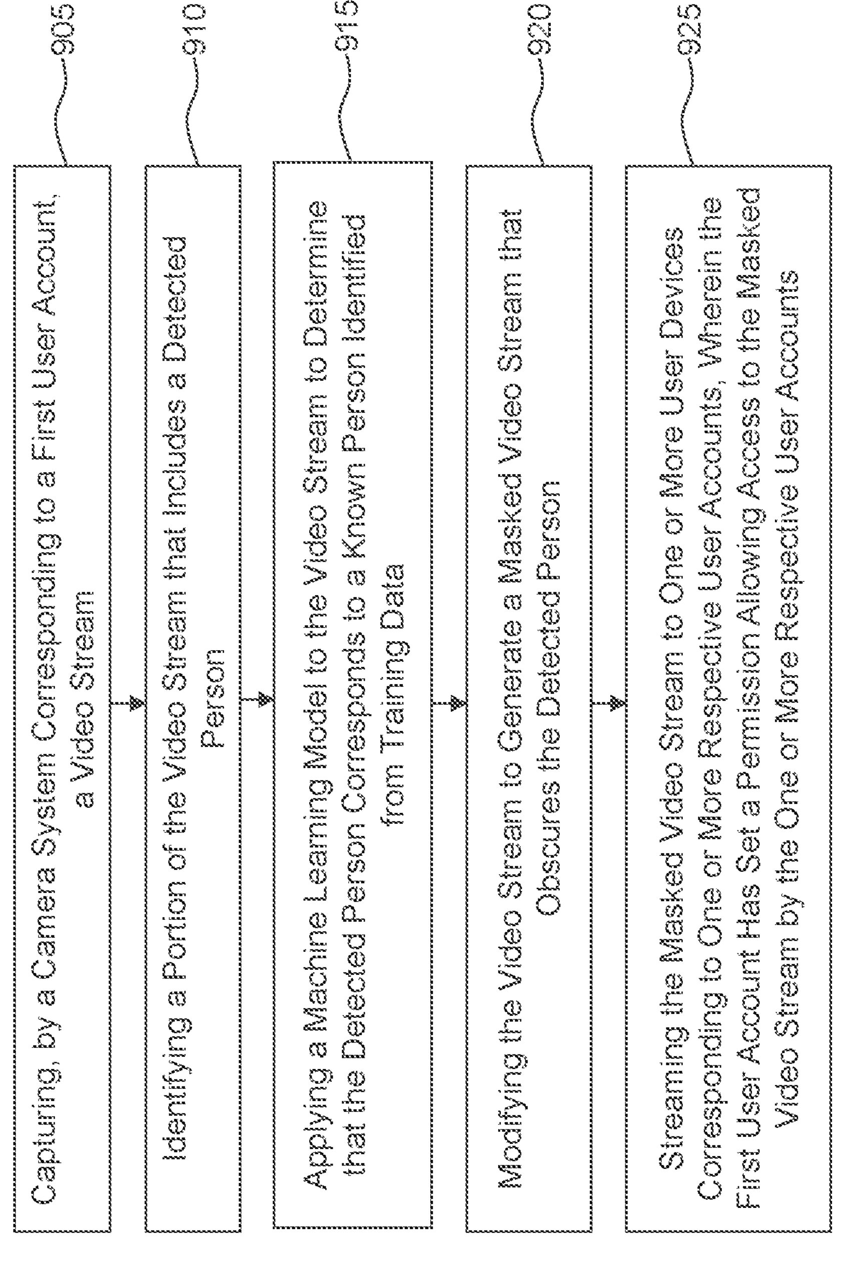
FIG. 9 illustrates a flowchart depicting a method for generating a masked video stream that obscures a detected person, according to some embodiments.

FIG. 9 illustrates a flowchart depicting a method 900 for generating a masked video stream that obscures a detected person, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 4B. However, method 900 is not limited to that example embodiment. A camera system 410A may modify a video stream to obscure a known person detected in a video stream. While method 900 is described with reference to camera system 410A, method 900 may be executed on any camera system 310, image compiler system 340, and/or any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

At 905, camera system 410A, corresponding to a first user account, captures a video stream. This may include recording one or more images and/or video frames. Camera system 410A may use image processor 312 to capture the video stream. Camera system 410A may capture one or more video frames using one or more lenses, aperture elements, electronic sensors, and/or camera elements. Camera system 410A may convert the captured images into digital data for analysis and/or modification.

At 910, camera system 410A identifies a portion of the video stream that includes a detected person. This may occur in a manner similar to GUI 600 as described with reference to FIG. 6. For example, a machine learning model may analyze the pixels of the video stream to identify a pattern indicating the presence of a person.

At 915, camera system 410A applies a machine learning model to the video stream to determine that the detected person corresponds to a known person identified from training data. A machine learning model may be preconfigured and/or trained to identify, classify, and/or label known persons. This training may occur using images of known people. For example, this may include members of a household or neighbors.

At 920, camera system 410A modifies the video stream to generate a masked video stream that obscures the detected person. This may occur in a manner similar to GUI 600 as described with reference to FIG. 6. For example, upon detection of a known person in a video stream, the camera system 410A may obscure this person using known person mask 640. This may provide additional privacy and/or hide the known person's identity. Known person mask 640 may include a cartoon and/or other avatar to replace the person in the video stream viewed via GUI 600. For example, known person mask 640 may include a stick figure.

At 925, camera system 410A streams the masked video stream to one or more user devices corresponding to one or more respective user account. The first user account may have set a permission allowing access to the masked video stream by the one or more respective user accounts. The user devices may view a GUI similar to GUI 600. This may include a mask for known persons but may still reveal unidentified persons 650.

Figure 10:
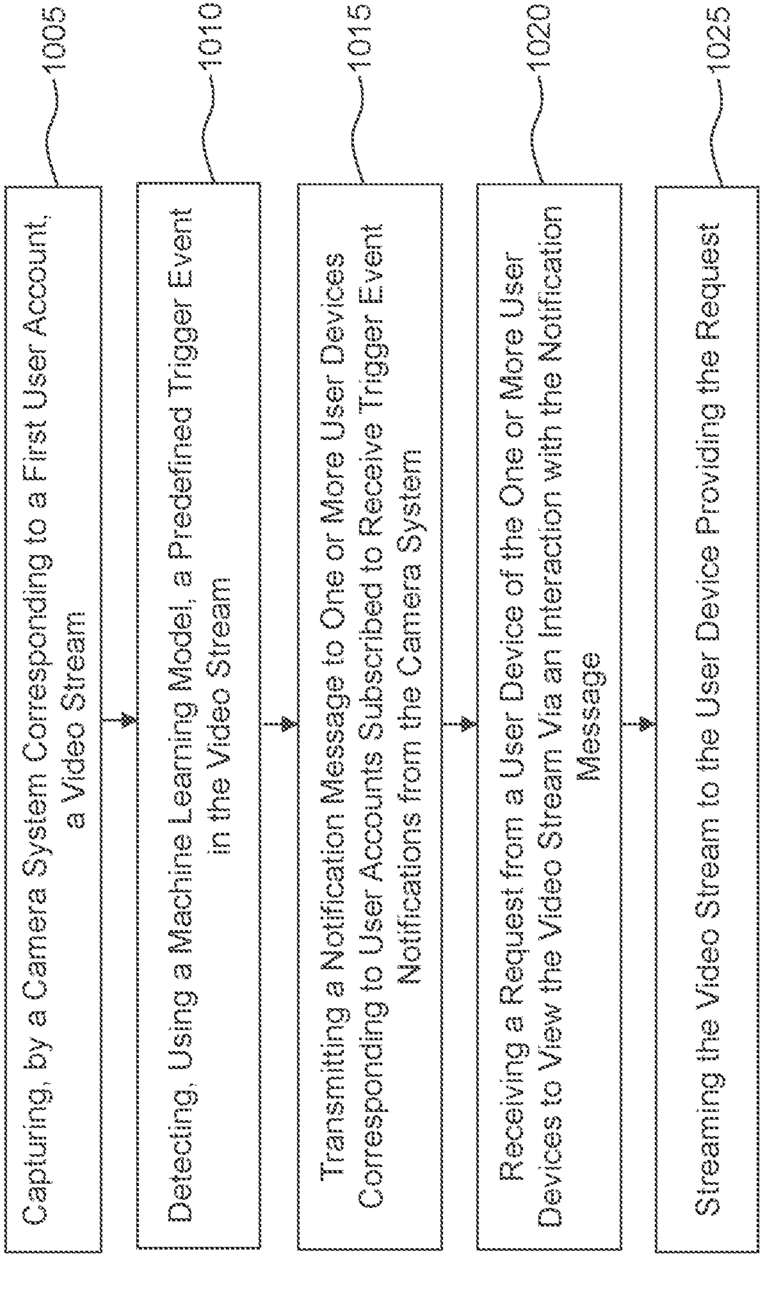
FIG. 10 illustrates a flowchart depicting a method for notifying one or more user devices in response to detecting a predefined trigger event, according to some embodiments.

FIG. 10 illustrates a flowchart depicting a method 1000 for notifying one or more user devices in response to detecting a predefined trigger event, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 4B. However, method 1000 is not limited to that example embodiment. A camera system 410A may detect a predefined trigger event and generate a notification message. While method 1000 is described with reference to camera system 410A, method 1000 may be executed on any camera system 310, image compiler system 340, and/or any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

At 1005, camera system 410A, corresponding to a first user account, captures a video stream. This may include recording one or more images and/or video frames. Camera system 410A may use image processor 312 to capture the video stream. Camera system 410A may capture one or more video frames using one or more lenses, aperture elements, electronic sensors, and/or camera elements. Camera system 410A may convert the captured images into digital data for analysis and/or modification.

At 1010, camera system 410A detects, using a machine learning model, a predefined trigger event in the video stream. The predefined trigger event may correspond to a feature that the machine learning model was previously trained to detect. As previously explained, the machine learning model may have been trained, pretrained, and/or retrained to detect the particular feature. Additionally, the feature may include detecting the presence of an object, the appearance of an object, the absence of an object, the disappearance of an object, events, and/or changes between multiple video stream frames. For example, the trigger event may be a moving vehicle and/or determining that a moving vehicle has entered a field of view of the camera system 410A. The machine learning model may generate a digital indication of the feature. This may include bounding boxes and/or modifications to one or more frames of the video stream as well to identify the detected feature. Examples of predefined trigger events may include the appearance of a delivery truck, the appearance of an animal, a thief that is stealing packages, and/or other events detectable by analyzing one or more video frames.

At 1015, camera system 410A transmits a notification message to one or more user devices corresponding to user accounts subscribed to receive trigger event notifications from camera system 410A. For example, the owner of camera system 410A may have granted permissions to the one or more user devices to be notified of a detected event. In this case, camera system 410A may transmit a notification to those devices. For example, this notification may appear on a smartphone and/or a display device. The notification may correspond to the detection of a garbage truck and/or inform a user that a garbage truck is ten minutes away. By interacting with the notification, the user may view the video stream captured by camera system 410A.

At 1020, camera system 410A receives a request from a user device of the one or more user devices to view the video stream via an interaction with the notification message. For example, the notification message may include a link or URL that is accessible. Clicking on this link may allow the user to view the video stream. The notification message may also occur within an application and/or as a push notification generated by the application. In this case, the user may view the video stream in the application on the user device.

At 1025, camera system 410A streams the video stream to the user device providing the request. For example, the user device may display the video stream on an Internet browser or in an application. The video stream may include one or more images of the predefined trigger event. The video stream may or may not be masked as previously described. User devices may also be configured to perform home automation actions in response to the trigger event notifications. For example, if a fire alarm or a flood alarm is flashing or sounding, a user may select to allow a neighbor to look into a home and/or stream the video stream.

The stream may also be used to track the movement of objects through the views of multiple camera systems 410. For example, children may be tracked via streaming videos as they move throughout a neighborhood. This may return a response to a user who wishes to know the location of their child. Similarly, if a child falls into a pool, an event trigger may notify a community of user devices to rescue the child. Camera feed stitching and/or video stream sharing may occur to provide surveillance coverage of an area.

Example Computer System

Figure 11:
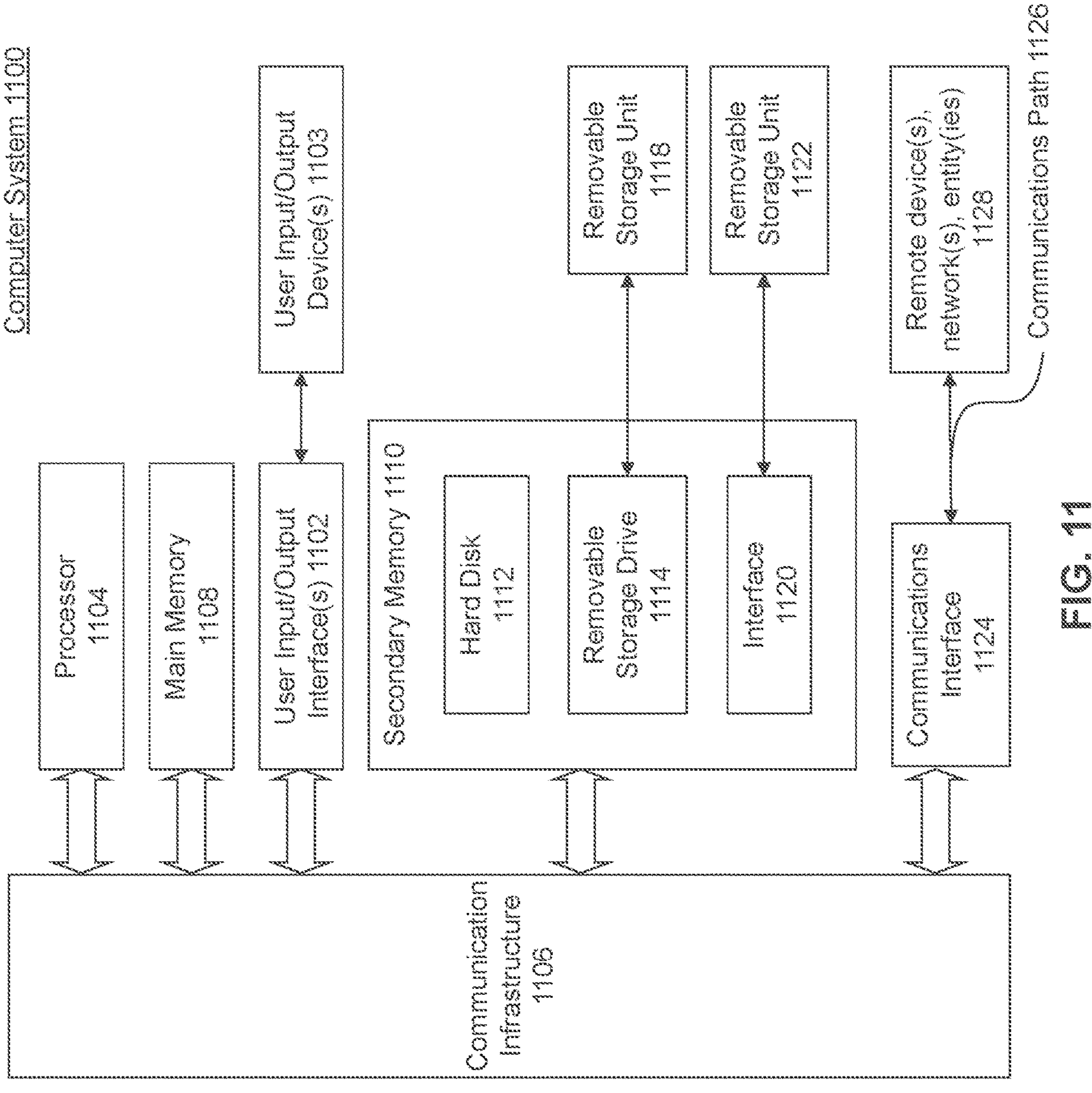
FIG. 11 illustrates an example computer system useful for implementing various embodiments.

Various embodiments may be implemented, for example, using one or more well-known computer systems, such as computer system 1100 shown in FIG. 11. For example, the media device 106 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for sharing a camera feed in a network of camera systems, comprising:

linking, by at least one computer processor, a first camera system to a first user device;

detecting a presence of a camera of a second camera system that is in a field of view of the first camera system based on one of an infrared-based strobing signal transmitted by the second camera system or a radio frequency-based strobing signal transmitted by the second camera system;

transmitting a command to the second camera system in response to detecting the presence of the camera, wherein the command requests permission to share a video stream from the camera with the first user device;

receiving a request message to share the video stream from the first camera system to a second user device linked to the second camera system;

determining, based at least on a pose of the camera of the second camera system, that the field of view of the first camera system comprises a private property associated with the first user device, public property, and property associated with the second user device;

generating a masked video stream that obscures the private property but not the property associated with the second user device; and streaming the masked video stream from the first camera system to the second user device.

2. The computer-implemented method of claim 1, further comprising:

determining that the field of view of the first camera system further comprises a property associated with a third user device, wherein generating the masked video stream comprises obscuring the third property associated with the third user device.

3. The computer-implemented method of claim 1, further comprising:

identifying a portion of the video stream from the first camera system corresponding to a detected person; and applying a machine learning model to the video stream from the first camera system to determine that the detected person corresponds to a known person identified from training data, wherein generating the masked video stream comprises obscuring the detected person.

4. The computer-implemented method of claim 1, further comprising:

monitoring the video stream from the first camera system to detect a predefined trigger event identified by a machine learning model trained to detect the predefined trigger event;

transmitting a notification message to one or more user devices corresponding to user accounts subscribed to receive trigger event notifications from the first camera system;

receiving a request from a user device of the one or more user devices to view the video stream from the first camera system via an interaction with the notification message; and streaming the masked video stream from the first camera system to the user device providing the request.

5. The computer-implemented method of claim 4, wherein the predefined trigger event includes identification of a moving vehicle.

6. The computer-implemented method of claim 4, wherein the predefined trigger event includes an emergency condition, and wherein the computer-implemented method further comprises:

streaming the masked video stream from the first camera system to an emergency response system.

7. The computer-implemented method of claim 1, further comprising:

classifying portions of the masked video stream with labels identifying contents of the portions.

8. A first camera system, comprising:

one or more cameras;

one or more memories; and at least one processor each coupled to the one or more cameras and at least one of the memories and configured to perform operations comprising:

linking the first camera system to a first user device;

detecting a presence of a camera of a second camera system that is in a field of view of the first camera system based on one of an infrared-based strobing signal transmitted by the second camera system or a radio frequency-based strobing signal transmitted by the second camera system;

transmitting a command to the second camera system in response to detecting the presence of the camera, wherein the command requests permission to share a video stream from the camera with the first user device;

receiving a request message to share the video stream from the first camera system to a second user device linked to the second camera system;

determining, based at least on a pose of the camera of the second camera system, that the field of view of the first camera system comprises a private property associated with the first user device, public property, and property associated with the second user device;

generating a masked video stream that obscures the private property but not the property associated with the second user device; and streaming the masked video stream from the first camera system to the second user device.

9. The first camera system of claim 8, the operations further comprising:

determining that the field of view of the first camera system further comprises a property associated with a third user device, wherein generating the masked video stream comprises obscuring the property associated with the third user device.

10. The first camera system of claim 8, the operations further comprising:

identifying a portion of the video stream from the first camera system corresponding to a detected person; and applying a machine learning model to the video stream from the first camera system to determine that the detected person corresponds to a known person identified from training data, wherein generating the masked video stream comprises obscuring the detected person.

11. The first camera system of claim 8, the operations further comprising:

monitoring the video stream from the first camera system to detect a predefined trigger event identified by a machine learning model trained to detect the predefined trigger event;

transmitting a notification message to one or more user devices corresponding to user accounts subscribed to receive trigger event notifications from the first camera system;

receiving a request from a user device of the one or more user devices to view the video stream from the first camera system via an interaction with the notification message; and streaming the masked video stream from the first camera system to the user device providing the request.

12. The first camera system of claim 11, wherein the predefined trigger event includes identification of a moving vehicle.

13. The first camera system of claim 11, wherein the predefined trigger event includes an emergency condition, and wherein the operations further comprise:

streaming the masked video stream from the first camera system to an emergency response system.

14. The first camera system of claim 8, the operations further comprising:

classifying portions of the masked video stream with labels identifying contents of the portions.

15. A non-transitory computer-readable medium having instructions stored thereon that, when executed by at least one computing device, cause the at least one computing device to perform operations comprising:

linking a first camera system to a first user device;

detecting a presence of a camera of a second camera system that is in a field of view of the first camera system based on one of an infrared-based strobing signal transmitted by the second camera system or a radio frequency-based strobing signal transmitted by the second camera system;

transmitting a command to the second camera system in response to detecting the presence of the camera, wherein the command requests permission to share a video stream from the camera with the first user device;

receiving a request message to share the video stream from the first camera system to a second user device linked to the second camera system;

determining, based at least on a pose of the camera of the second camera system, that the field of view of the first camera system comprises a private property associated with the first user device, public property, and property associated with the second user device;

generating a masked video stream that obscures the private property but not the property associated with the second user device; and streaming the masked video stream from the first camera system to the second user device.

16. The non-transitory computer-readable medium of claim 15, the operations further comprising:

determining that the field of view of the first camera system further comprises a property associated with a third user device, wherein generating the masked video stream comprises obscuring the property associated with the third user device.

17. The non-transitory computer-readable medium of claim 15, the operations further comprising:

identifying a portion of the video stream from the first camera system corresponding to a detected person; and applying a machine learning model to the video stream from the first camera system to determine that the detected person corresponds to a known person identified from training data wherein generating the masked video stream comprises obscuring the detected person.

18. The non-transitory computer-readable medium of claim 15, the operations further comprising:

monitoring the video stream from the first camera system to detect a predefined trigger event identified by a machine learning model trained to detect the predefined trigger event;

transmitting a notification message to one or more user devices corresponding to user accounts subscribed to receive trigger event notifications from the first camera system;

receiving a request from a user device of the one or more user devices to view the video stream from the first camera system via an interaction with the notification message; and streaming the masked video stream from the first camera system to the user device providing the request.

19. The non-transitory computer-readable medium of claim 18, wherein the predefined trigger event includes an emergency condition, and wherein the operations further comprise:

streaming the masked video stream from the first camera system to an emergency response system.

20. The non-transitory computer-readable medium of claim 15, the operations further comprising:

classifying portions of the masked video stream with labels identifying contents of the portions.

* * * * *